United States Patent [19]
Flohr

[11] Patent Number: 5,612,733
[45] Date of Patent: Mar. 18, 1997

[54] OPTICS ORIENTING ARRANGEMENT FOR VIDEOCONFERENCING SYSTEM

[75] Inventor: Daniel P. Flohr, Wilmington, N.C.

[73] Assignee: C-Phone Corporation, Wilmington, N.C.

[21] Appl. No.: 444,155

[22] Filed: May 18, 1995

Related U.S. Application Data

[63] Continuation-in-part of Ser. No. 25,934, Jul. 18, 1994, Pat. No. Des. 363,730.

[51] Int. Cl.$^6$ ....................................... H04N 7/14
[52] U.S. Cl. ................................. 348/14; 348/20
[58] Field of Search .................... 348/20, 14, 15, 348/373, 375, 16, 17, 18, 19; 379/96, 202

[56] References Cited

U.S. PATENT DOCUMENTS

| | | | |
|---|---|---|---|
| 5,099,262 | 3/1992 | Tanaka et al. | 348/232 |
| 5,117,285 | 5/1992 | Nelson et al. | |
| 5,257,306 | 10/1993 | Wantanabe. | |
| 5,318,257 | 6/1994 | Tani | 348/14 |
| 5,359,362 | 10/1994 | Lewis et al. | 348/15 |
| 5,374,952 | 12/1994 | Flohr. | |
| 5,436,654 | 7/1995 | Boyd et al. | 348/14 |
| 5,473,679 | 12/1995 | La Porta et al. | 348/14 |

FOREIGN PATENT DOCUMENTS

| | | | |
|---|---|---|---|
| 4-40798 | 2/1992 | Japan | 381/160 |

*Primary Examiner*—Stella Woo
*Attorney, Agent, or Firm*—Furgang & Milde, LLP

[57] ABSTRACT

A video camera adapted for use with a computer monitor, the video camera including a first housing and an optical video sensor mounted in the first housing and arranged to view the face of a computer operator, the monitor including a second housing and a display screen mounted in the second housing and arranged to be viewed by the computer operator, the display screen having an image surface, and the second housing including a frame portion disposed adjacent to the image surface at a top portion thereof, the frame having a top surface. The first housing is configured to position the optical video sensor between said display surface and the computer operator, superimposed along axis between the computer operator and the display surface on the frame at a position adjacent the display surface and below the top of the frame, and at a position between the lateral sides and not substantially obscuring the display surface. This configuration provides an video image which appears, in a videoconferencing system with a corresponding image displayed on the display surface, as a face-to-face communication.

17 Claims, 8 Drawing Sheets

OPTICS ORIENTING ARRANGEMENT FOR VIDEOCONFERENCING SYSTEM

CROSS-REFERENCE TO RELATED APPLICATION

The present application is a continuation-in-part of commonly owned U.S. patent application Ser. No. 29/025,934, filed Jul. 18, 1994 entitled "DESIGN FOR A VIDEO CAMERA UNIT" and now U.S. Pat. No. Des. 363,730.

BACKGROUND OF THE INVENTION

The present invention relates to videoconferencing systems, and more particularly, to optical orienting subsystems for videoconferencing systems. Such optics orienting arrangements are employed to facilitate a virtual face-to-face communication between parties to a videoconference.

As so-called "videoconferencing" applications are incorporated into personal computers to allow audio-visual interaction of a person with a machine, and possibly through a telecommunications system, interaction between two or more other persons is made possible. In such systems, a user will look at a screen, which may be a cathode ray tube, liquid crystal display, or other type of display which can present an image, while communicating with or through the machine. A system of this type is disclosed in the U.S. Pat. No. 5,374,952 to Daniel P. Flohr, the subject matter of which is incorporated herein by reference.

Existing videoconferencing systems of this type provide an electronic camera to capture an image of the user, which is rescanned periodically. Because the line of sight to the screen should not be obstructed, cameras are placed above or beside the screen. This placement, however, necessitates an orientation of the camera such that the user, while interacting with the machine, is generally looking away from the camera. This is especially obtrusive if the eyes are aimed toward a point laterally displaced from the camera. Thus, in a videoconferencing situation, a face-to-face communication is difficult, because the user must either look at the screen, where an image of the person he is communicating with is located, or at the camera, but not both. In the general arrangement the screen is large enough, and the person sits close enough to the screen, such that the camera and screen are not within the cone of high visual acuity simultaneously.

In order to address this problem, it has been proposed to place the lens and part of the electronics or fiber optics on the end of a goose neck arm, to allow the lens to be positioned near the screen. This goose neck arm, however, is not transparent, and therefore obstructs view, when placed in front of the screen.

An alternative system employs a screen which is small, or placed far from the user. These diminish the perceived quality of the communication. When a large screen is available, i.e., one which is greater than 7" diagonally, it is preferred that this screen, for individual videoconferencing purposes, be located 25–75 cm from the user. Increasing the distance from the user or reducing the size of the screen or the image on the screen, impedes the personal nature of the communication.

A further alternative system employs a so-called "heads-up display", wherein an image is optically projected without a screen in front of the user. This requires a complex headset or projection system, and results in an image of a person wearing the headset or in a special environment.

It is also known to use a full screen size partially reflective filter in front of the screen to allow a frontal image of the user to be reflected to an electronic camera, as shown in the U.S. Pat. No. 5,117,285 to Nelson et al. and the U.S. Pat. No. 5,257,306 to Watanabe. These arrangements necessitate a large optical surface which produces reflections and diminishes the perceived display brightness. The U.S. Pat. No. 5,257,306, incorporated herein in its entirety by reference, provides a system in which the optical orientation of the user with the system may vary, to allow a large videoconference to have a "central" figure with others peering toward him or her on screen.

An image of a user may also be used for non-keyboard communication with the machine, whether in the context of a videoconferencing system or not. For example, an optical gaze position sensor is known which employs an electronic camera. This system may also benefit from a frontal image rather than one which is skewed because the user is looking at the screen rather than the camera.

For video interface applications, a system should include:

(1) an image display, i.e., the screen;

(2) an image input device, e.g., a video camera;

(3) an acoustic annunciator, e.g., a loudspeaker;

(4) an acoustic signal input, e.g., a microphone;

(5) a control for the audio system, preferably including a half duplex audio control or an echo cancellation system for full duplex operation;

(6) a control for the image systems, preferably including video conversion for the transmitted and received signals.

When the screen is a part of a digital computer, the image is displayed through the computer circuit, preferably through a so-called "video window controller" or "video controller". The image on the screen may encompass the entire active display area, or other data may also be simultaneously presented.

SUMMARY AND OBJECTS OF THE INVENTION

The present invention provides within a suitable housing, an electronic camera—e.g., a ⅓" CCD color video camera—with an appropriate lens—e.g., a 5 mm f1.8 optic. A mounting portion of the housing is placed above the screen, e.g., a CRT, with the lens and camera extending in front of an image plane of the screen, as low as possible without substantially obstructing view of an image portion of the screen. Advantageously, this camera housing, which extends below the top edge of the display housing, also includes an audio loudspeaker which directs sound toward the screen for reflection to the user. Thus, the user peers toward the screen and appears to be looking directly at the camera, while perceiving audio to be emanating from the screen. The microphone may be mounted anywhere proximate to the user, due to the dispersive nature of sound, although the microphone system is preferably located in the camera housing as well.

The camera may operate in ambient light, although a color glare from the screen may produce unnatural skin tones. In this case, the image may be color corrected electronically, or a white light illumination source provided which minimizes the effects of ambient lighting. An electronic compensation may be effected by obtaining an image while the screen is not operating or under a standard lighting condition, and then activating the screen to produce a typical illumination. A color mapping may then be used to compensate for the illumination by the screen.

The microphone and loudspeaker are preferably provided with a control for full duplex operation. Such a control cancels the signal produced by the loudspeaker from a transmitted signal by the microphone. Thus, a two-way conversation may be conducted simultaneously. Such systems generally compensate for direct and reflected sound paths from the loudspeaker to the microphone. Advantageously, the audio controller also compensates for multipath signals from the user to the microphone, which may otherwise produce a tunnel effect when the system is operated in a "live" environment; i.e., one with low sound absorptivity surroundings. Further, a system may also be employed to cancel environmental sounds, such as computer fans, monitor flyback transformer, hard disk drive bearing noise and head positioning noise, keyboard clatter, typical modem communication negotiation sequences, telephone ringing, desk vibrations, drawer opening and the like. Many of these sounds are particularly objectionable where a number of persons are engaged in a simultaneous videoconference, and background noises are distracting. Intelligent filtering of environmental acoustic emissions allows a greater microphone sensitivity to be employed. Since many of these types of noises are caused by intermittent computer associated events, the computer may actively blank the microphone based on the occurrence of events associated with such noises, such as keyboard clatter and keyboard scan codes. An adaptive filter may also be used to suppress HVAC-associated noises and the like.

In another embodiment according to the present invention, a compact optical system may be employed which includes a reflective element which is located below the top of the display housing and may even protrude into the area of the video image. The reflective element may be a fully reflective mirror on a semitransparent mirror. Preferably, the image controller places the video image below, but not superimposed on, the location of the reflective element. This arrangement allows the electronic components of the camera to be located above the monitor housing and to receive the image of the user by means of an optical system that forms a "periscope".

In the preferred system, the imaging camera is interfaced to a controller board within a computer, such as an IBM-PC compatible computer, operating with Microsoft Windows software. The computer, in turn, is preferably networked to other computers through a network, e.g., ethernet, full duplex ethernet, token ring, ATM, 100 base VG, FDDI, etc., operating under a network operating system, e.g., Novell Netware, Artisoft Lantastic and Microsoft Windows for Workgroups. The controller processes the video and audio signal, which are transmitted to a network control system which operates on a separate network, in which videoconference signals are preferably frequency domain multiplexed. For wide area networks, e.g., those with portions off site, a digitally compressed video signal may be efficiently transmitted and received. This compression may be, e.g., H.320 format, H.261, P×64, MPEG, MPEG2, or other known formats. Likewise, the separate videoconference network provides one or more signals which may be tuned by the network control system and fed to the controller board for display.

Communication of the videoconferencing system with other sites may occur through a public switched telephone network (PSTN), on such lines as switched 56 kB, fractional or full T1, T3, E-1, ISDN, SDNET, FDDI, ATM or other high bandwidth telecommunication systems. Dedicated lines, Internet connections, or other connections may also be employed.

The camera portion of the present system is preferably functionally and aesthetically compatible with its location in use, mounted on top of a standard computer CRT monitor. Thus, the camera unit should be functionally immune from electrical or magnetic interference from the monitor and other equipment normally found in homes and offices, including wireless networks, cellular phones, wired networks and lighting fixtures. This may be obtained by EMI and magnetic shielding, e.g., copper or nickel shielding for EMI, permalloy, Mu metal or iron for magnetic fields, though the device is preferably inherently immune to such fields. Further, the device should not generate unacceptable interference with the monitor or other equipment. Thus, there should be no substantial stray magnetic fields, which would disturb the monitor. Further, any incidental or intentional emissions, i.e., wireless communication, should preferably not unacceptably interfere with other devices. The functional standards for environmental electromagnetic interference may differ from those promulgated by the FCC or other standards setting organizations, due to the particular environment of operation of the device.

The casing for the camera is preferably a high impact thermoplastic, having a color and texture which is similar to that used in monitors, i.e., beige or grey. The casing has a front portion which includes the lens, extending downward, so that when mounted at the front of the top of the monitor, the lens is held over a portion of the monitor bezel. The camera is mounted to the monitor by any means, including hook and loop fastener (Velcro) strips, adhesive, removable adhesive, mechanical fasteners, e.g., screws, or may be adapted to form fit to the design of a particular monitor. It is also possible to allow the camera to rest on the monitor without being affixed, so long as the center of gravity is well behind the lens overhang and the cable is unlikely to be disturbed.

The camera preferably includes a lens, e.g., a 5 mm f1.8 optic, having a fixed or variable focus, in front of an image sensor, preferably a ⅓" color CCD. The CCD is preferably interfaced to an electronic control module in the housing, which may be located in a flat box-shaped portion residing on top of the monitor. This electronic control module preferably produces either a NTSC composite video signal or another format useful for transmission. This module also may control other functions, e.g., iris, lighting, color balance, shutter speed, focus, and perspective alteration, as necessary.

The audio pickup system also preferably resides in the housing, and preferably consists of three microphones arranged along the top front edge of the housing, controlled to be directionally sensitive to the user by electronics located in the housing.

The camera preferably communicates with another electronic device for controlling a teleconferencing function, e.g., a board in the computer. However, it is noted that the camera may also include all of the circuitry necessary for networking, or may have minimal circuitry, instead relying on an external control system. The camera may communicate with an external controller in any known manner, including coaxial cable, shielded or unshielded twisted pair, wires, ribbon cable, radio frequency, spread spectrum, infrared or visible light through air directly or reflected or fiber optic cable or light pipe, ultrasonic signals, or other known means. The preferred communication method is via coaxial cable or unshielded twisted pair.

The camera is preferably powered by low voltage power, e.g., less than about ±15 VDC, through a power cable.

However, the camera may also be powered by an internal battery or 120–240 VAC line current.

The signal and power connectors to the camera preferably are included in a single cable assembly, although separate cables may be used for video, audio, power and control signals. For example, many video camera devices have an integral connector including an RCA-type connector for video, and RCA-type connector for audio, and a coaxial mini plug for power. Other known designs include miniature circular DIN connectors, which include video, audio, power and control signals.

When a perspective control feature is included, the lens is physically moved along a track on top of the monitor, or an optical system providing at least front and one oblique angle view facing the user is provided. This may be controlled by a mirror system with a mechanical or electronic shutter, with an optical combiner, or other known means. In another embodiment, a fiber optic bundle is employed behind the lens, allowing the image detector to be located remotely. In this case, the lens may be small, with the fiber optic bundle on an arm extending in front of the monitor bezel. In this case, the arm may move, or a plurality of bundles be provided, which may interface with one or more image detectors.

The lens assembly and associated image detector preferably have a length no greater than about 2.5", and a diameter of no greater than about 2.5". The lens assembly is affixed to an arm which extends downwardly from an elongated box-shaped member which lies on top of the monitor. The box is preferably no greater than about 1.5" tall, and about 4" wide. The box may be as deep as is necessary, although preferably no greater than about 12", and more preferably no greater than about 9". When the camera is combined with a speaker, the speaker preferably is mounted under the downwardly extending arm, facing toward the monitor screen. The perceived point of sound emission by the user will then be from a point on the screen, rather than around it or next to it as would be the case with speakers located behind or next to the monitor. In this instance, the speaker is preferably about 1–4" from the surface of the monitor, and tilted at an angle of between about 0°–60° with respect to the image surface of the screen, more preferably between about 15°–45°. The speaker is preferably controlled in conjunction with the audio pickup system and may also be controlled in conjunction with the video camera, or may be separate. The speaker may be, e.g., a 1–2" Mylar or paper dome speaker or piezo electric transducer having a frequency range from about 100–8,000 Hz. The speaker is preferably acoustically shielded from the acoustic pickup system.

The camera preferably linked to a controller which resides within a computer, e.g., a desktop computer. This controller may include video display functions, e.g., VGA, super VGA, although preferably the controller interfaces with an existing video controller in the computer. Further, the controller may produce signals which are conveyed through the computer bus, i.e., ISA, PCI, VLB, NUBUS, SCSI, SCSI-2, or SCSI-3. The controller preferably communicates through a separate network interface to a videoconference network, which is preferably a frequency domain multiplexed system, i.e., with channels and a tuner for transmitting analog or digital video, although the videoconference signals may also be transmitted through a standard computer network system as, i.e., compressed digital video. The data compression may be, e.g., MPEG, MPEG-2, JPEG, other DCT, P×64, H.320, H.261, fractal, wavelet or other known compression technology for videoconference data. Thus, a system using the present camera may provide videoconferencing capability through standard 75 Ω cable, thereby reducing a loading of a digital data network by videoconference data, which may be analog and/or multiplexed or modulated signals. Control signals may be transmitted through a separate computer or telephone network or included as a digital control channel on the videoconference system network.

It is therefore an object of the present invention to provide a system for obtaining an improved frontal view of a user of a camera input to a system having a view screen, such as a videoconferencing system.

It is a further object of the present invention to provide in a system with a screen having a bezel, a camera which is positioned at a periphery of a screen, having a lens which is located in a plane in front of the bezel and as near to the edge of the screen as desired, or even occupying a border portion of the screen.

It is a still further object according to the present invention to provide a video input system for a computer having a screen with a size greater than about 15 cm diagonally, which has a lens positioned between a user and an image plane of the screen at a position proximal to the screen in the screen-user axis and above the screen immediately adjacent to the image area of the screen.

It is a still further object of the present invention to provide a video system which sits above a screen for display of an image, having a single camera and an optical system which provides an ability to change an orientation of the optical system with respect to the user to allow an oblique view, based on a control signal. This video system also includes a tracking system for determining a glance angle of a user, which may be used to control the orientation of the optical system.

These and other objects will become apparent by a review of the detailed description and the drawings. The preferred embodiments are described in detail with respect to the drawings, which should be considered as exemplary and not limiting as to the scope of the invention.

BRIEF DESCRIPTION OF THE DRAWINGS

The invention will now be described by way of the drawings, in which.

DETAILED DESCRIPTION OF THE PREFERRED EMBODIMENTS

Figure 1:
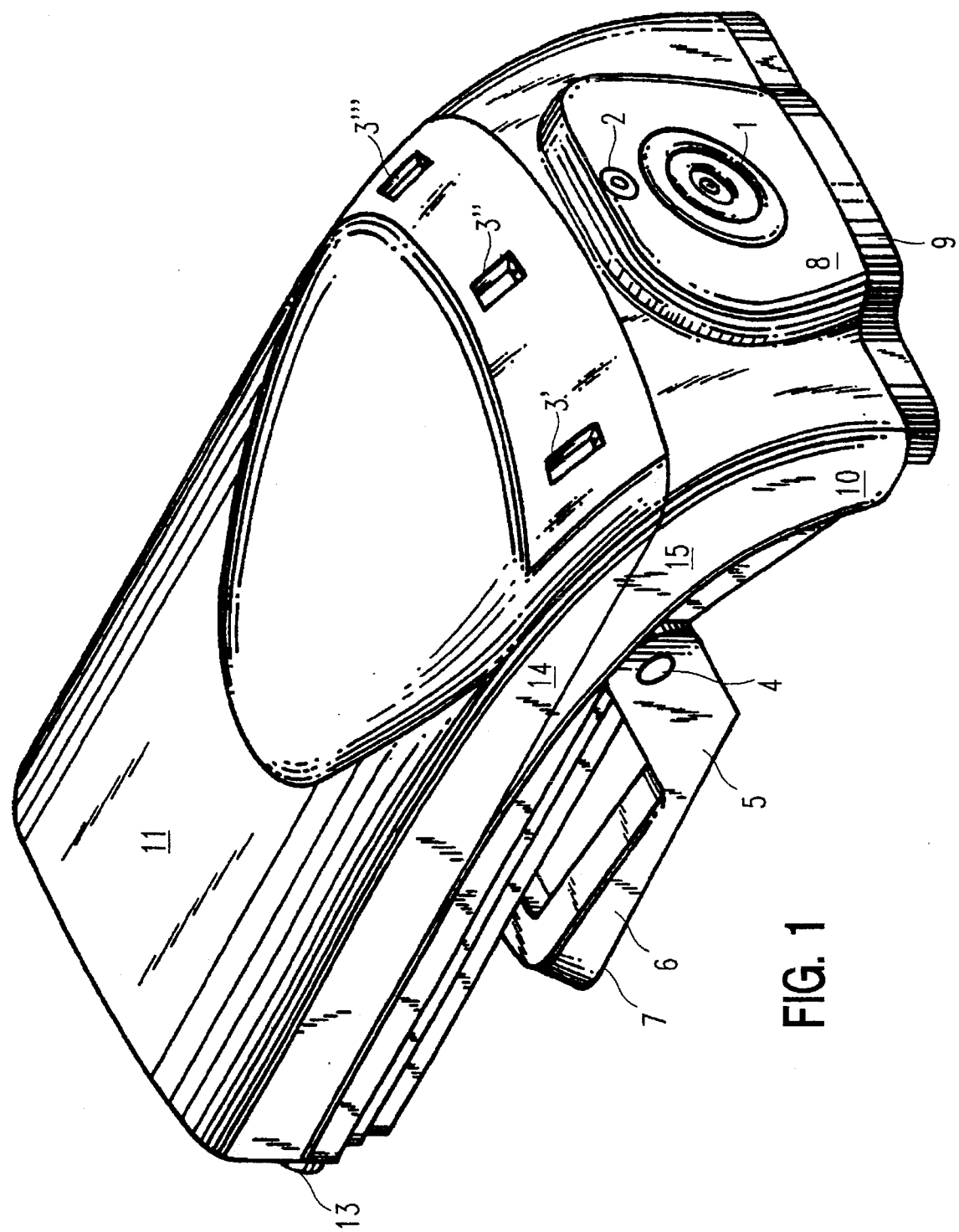
FIG. 1 is an oblique front view of the video camera according to the present invention.
Figure 2:
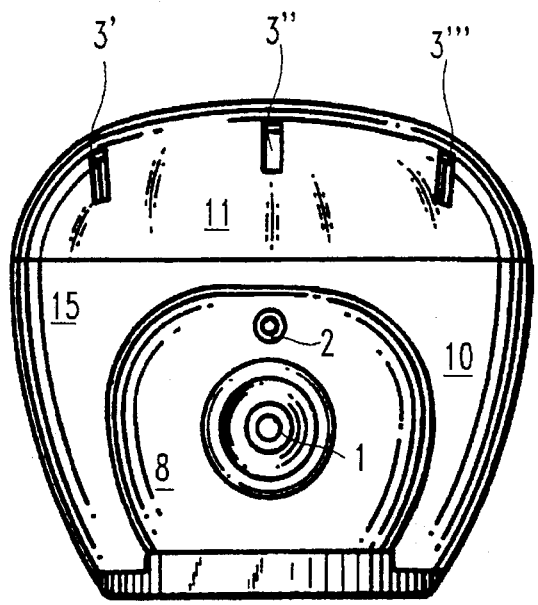
FIG. 2 is a front view of the camera according to FIG. 1.
Figure 3:
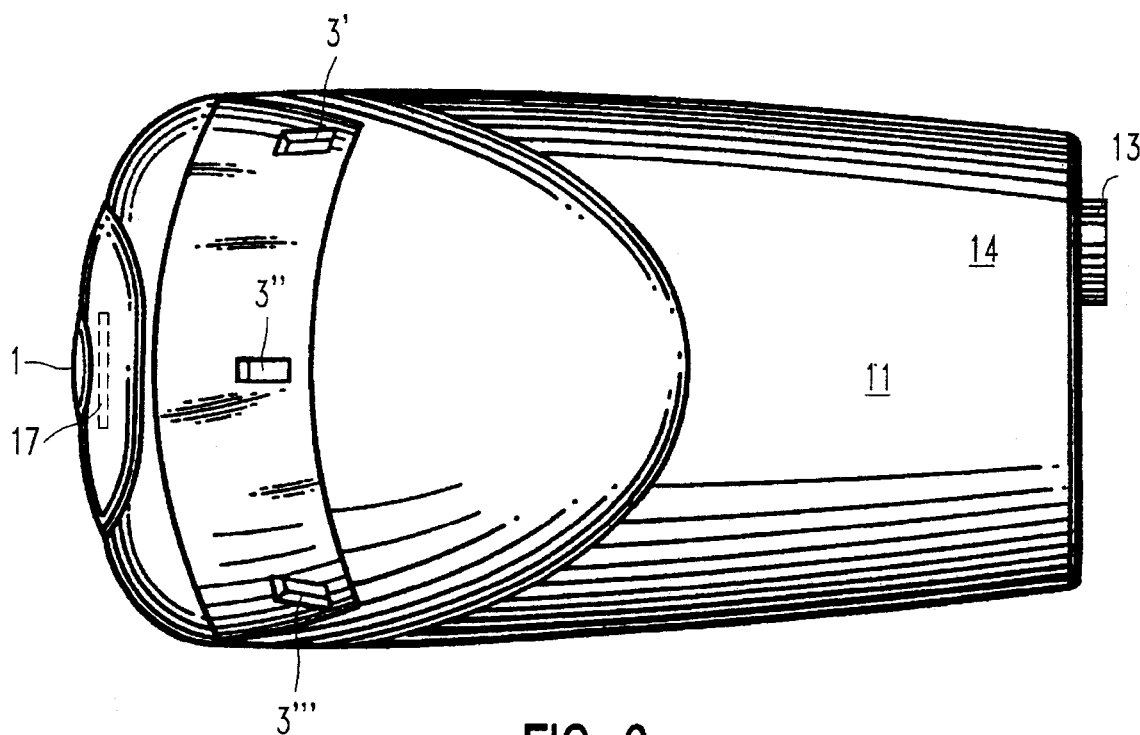
FIG. 3 is a top view of the camera according to FIG. 1.
Figure 4:
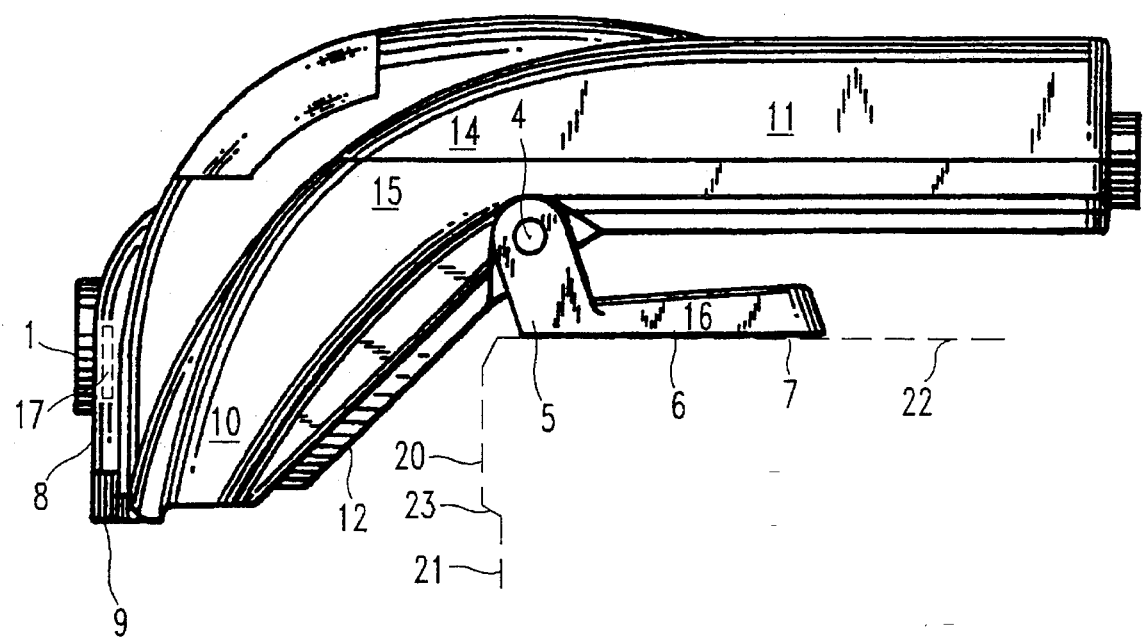
FIG. 4 is a left side view of the camera according to FIG. 1.
Figure 5:
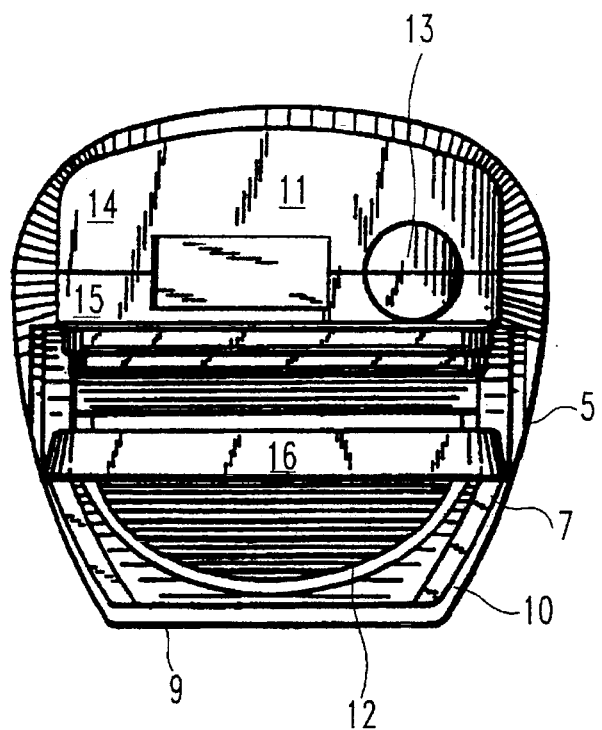
FIG. 5 is a rear view of the camera according to FIG. 1.
Figure 6:
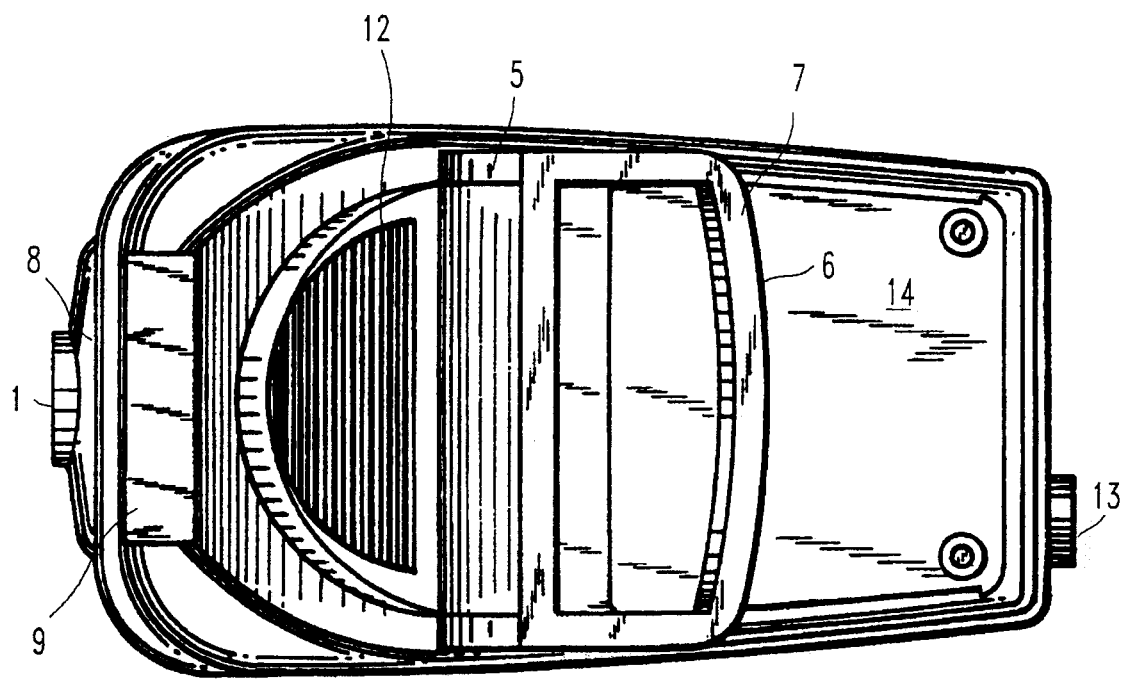
FIG. 6 is a bottom view of the camera according to FIG. 1.
Figure 7:
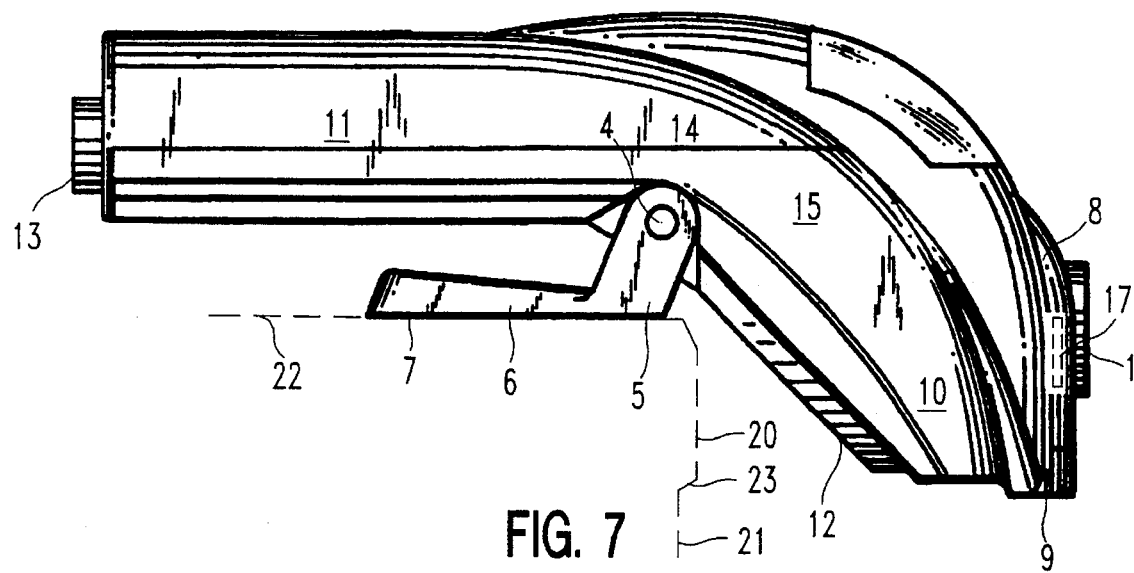
FIG. 7 is a right side view of the camera according to FIG. 1.

The video camera unit according to the invention will now be described with reference to FIGS. 1 through 11.

Identical elements in the various figures are designated with the same reference numerals.

Referring to FIGS. 1–7, a camera lens 1 is present at the front of a camera housing 11, facing the user. A photodetector 2, also at the front of the housing 11, determines a brightness level and adjusts the electronic shutter speed of the camera function accordingly. The lens 1 is mounted in a lower dependent arm 10 of the housing 11, with the imaging detector 17—e.g., a CCD color video camera—disposed immediately behind it in an expanded portion 8 thereof. The lower dependent arm 10 has a bottom edge 9, which lies in front of a bezel 20 of a monitor 22, (FIGS. 4, 7 and 8) at a position approximately parallel to a lower edge 23 of the bezel 20. The lower dependent arm 10 lies in front of an image plane 21 of the monitor.

The housing is divided along a horizontal plane into an upper half 14 and a lower half 15, which are assembled with electronic, imaging and audio components therewithin to form the housing 11. Extending from a rear aspect of the housing is a signal connector 13, which links in known manner to a signal cable, not shown. A connector 14 is also provided, which may include both signal and control functions.

Three microphones 3', 3" and 3''' are provided, which allow a highly directional sensitivity to be provided to help eliminate stray noises. Because the lens 1 is directed at the user, the center microphone 3" receives the primary signal, with the signals from the microphones 3' and 3''' used to compensate for off axis noises. The processing circuitry for the microphones 3', 3" and 3''' is contained in the housing 11.

A speaker 12 is provided in the lower casing half 15, at the rearwardmost portion of the lower dependent arm 10, directed approximately at a 45° angle facing the bezel 20 and imaging plane 21 of the monitor 22. The sound from the speaker 12 is reflected off these hard surfaces back to the user. The speaker 12 is a 2" diameter round paper cone speaker.

In the lower casing half 15 of the housing 11, at approximately the intersection of the plane of the speaker 12 and a lower surface of the lower casing half 15, a stand 16 is provided. The stand 16 is rotationally supported by a lateral cylindrical projection 4, provided on both sides of the housing 11. The stand 16 has a spacer arm 5, which is about 2 cm long, and a base 6, which is about 5 cm long, having a lower surface 7. The center of gravity of the camera, including the housing 11 and all elements contained therewithin, lies within the confines of the lower surface 7 of the stand 16, to provide stability. The center of gravity preferably is toward the rear of the base 6, to prevent toppling of the camera. The stand 16 may be affixed by adhesive or fastener to the monitor 22.

Figure 8:
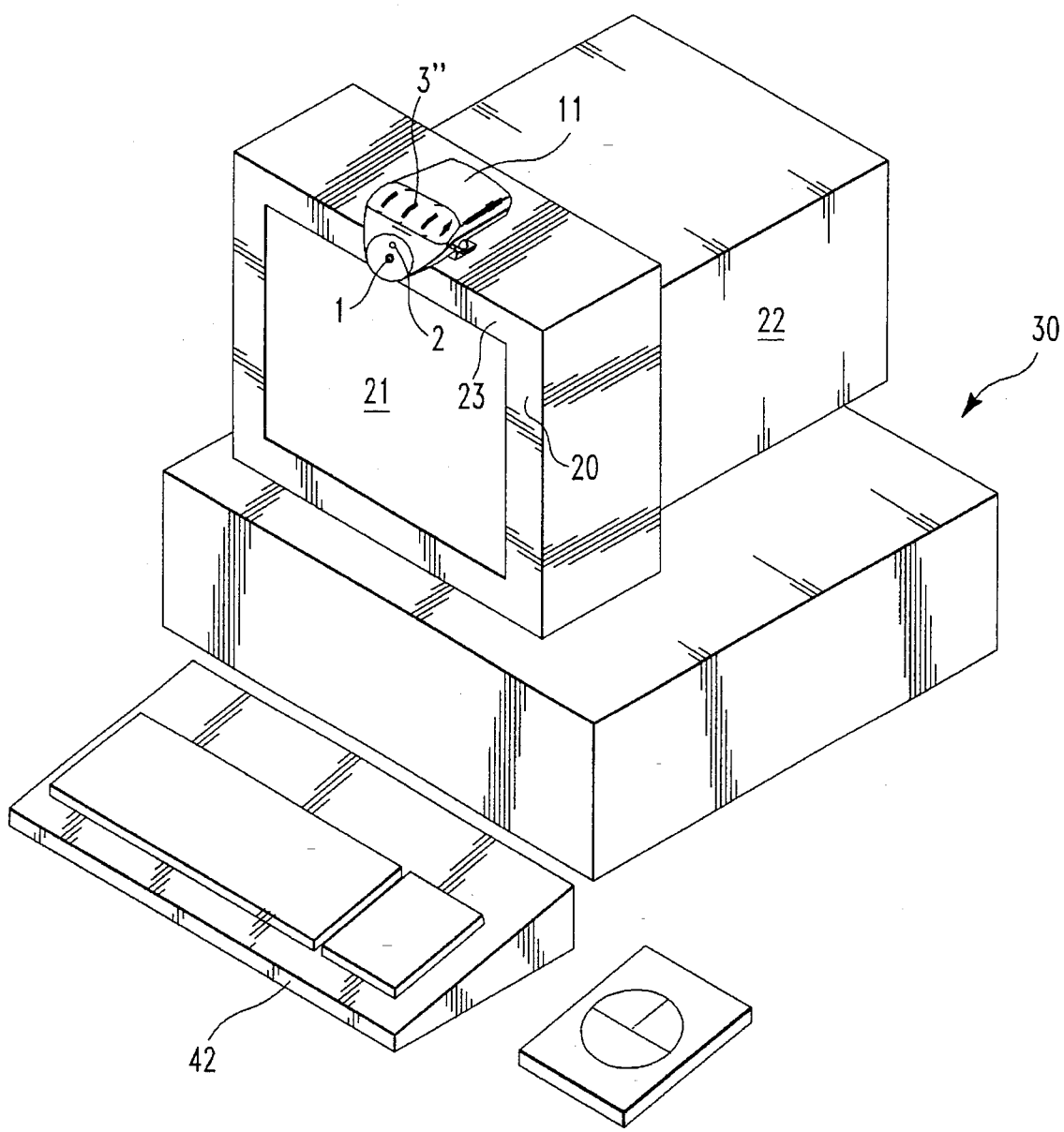
FIG. 8 is a perspective view of the camera according to FIG. 1 mounted on a monitor.

FIG. 8 illustrates how the video camera unit is mounted on the monitor 22 of a personal computer or "PC" 30. The stand 16 of the camera unit housing 11 is attached, e.g., by Velcro or an adhesive, to the frame of the monitor housing such that the lens 1 lies in front of the bezel 20 at a position below the top of the frame and just above the top of the image plane 21.

Figure 9:
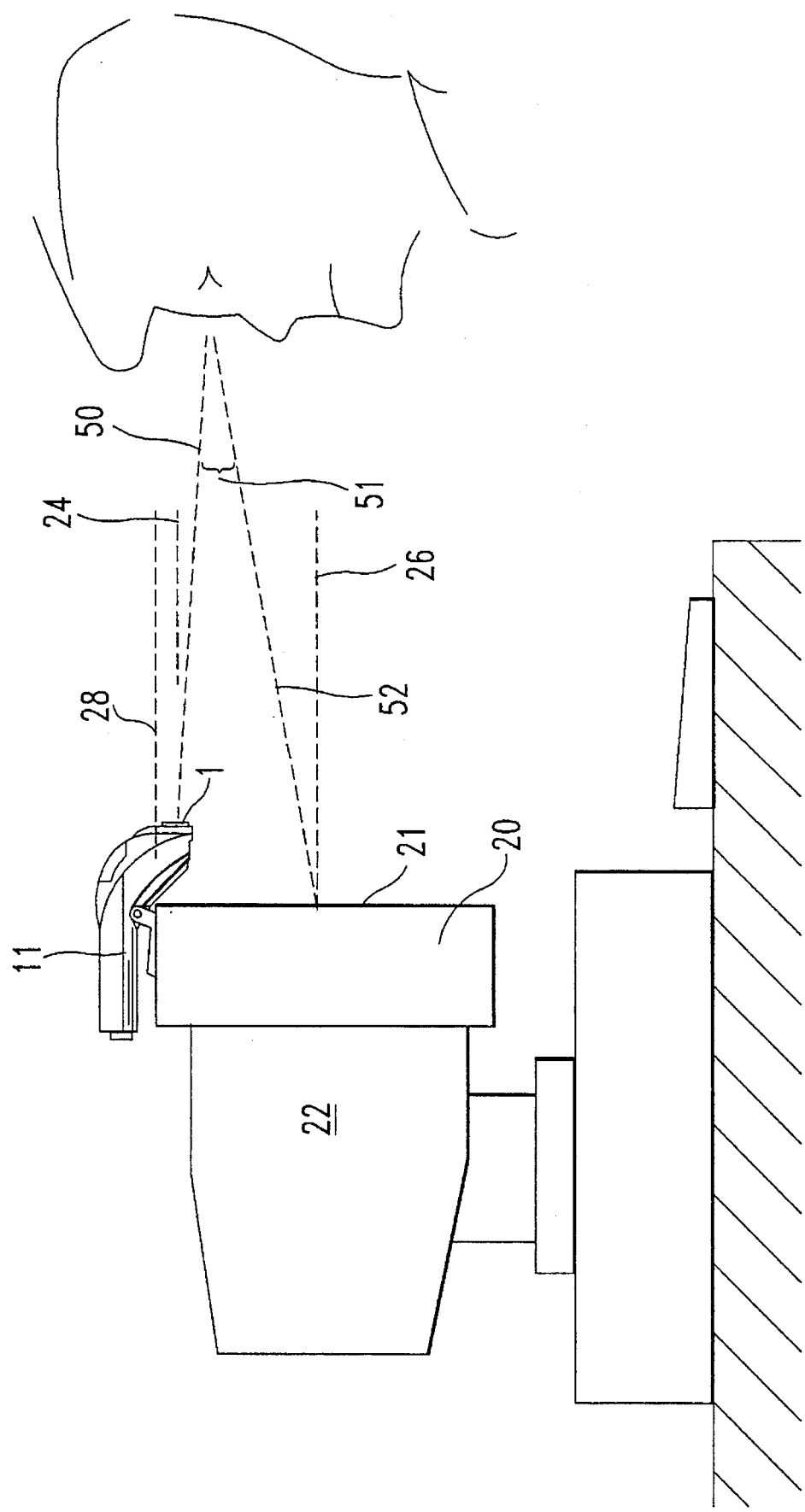
FIG. 9 is a side top view of the camera according to FIG. 1 mounted on a computer monitor.

FIG. 9 shows this arrangement in side view whereby the optical axis 24 of the lens 1 is arranged substantially parallel to the central axis 26 of the monitor 22. The central axis 26 is perpendicular to the image plane 21 of the monitor and passes through the center of the screen. The optical axis 24 lies below the level 28 of the top of the monitor 22.

As a result of this arrangement, according to the invention, the optical axis of the lens 1 is at approximately eye level so that the image of a user, which appears on the screen of another PC, will appear to be looking directly forward, thus establishing eye-to-eye contact with the user of this other PC.

Stated another way, if the video camera 11 views the eyes the user along a first axis 50, while the user is observing the screen along a second axis 52, the present invention reduces the included angle 51 between these two axes to a minimum value. The result of this reduction of the angle 51 is illustrated in FIG. 10a.

Figure 10A:
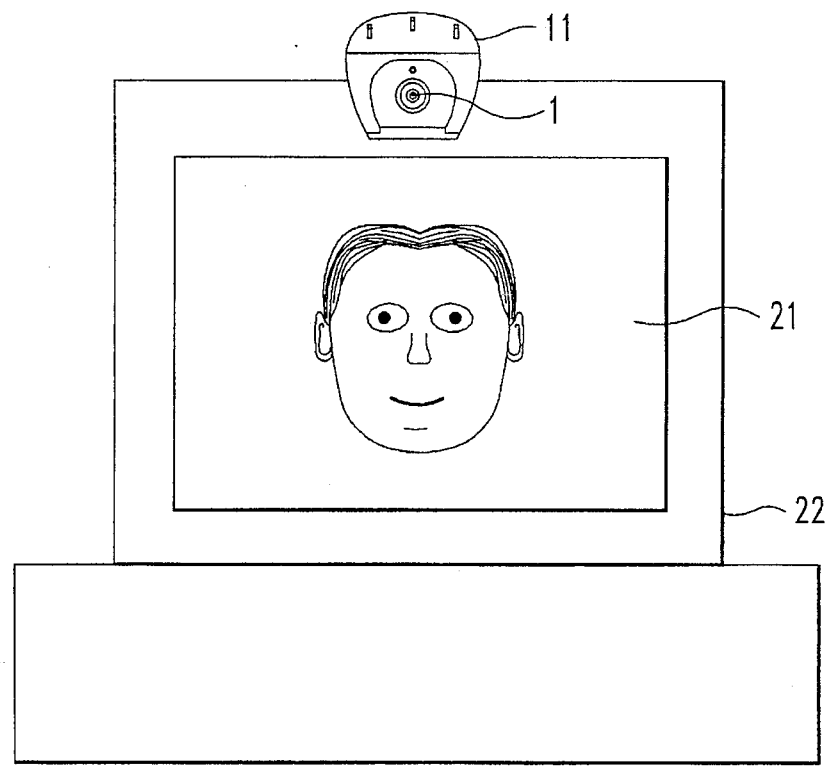
FIGS. 10*a* and 10*b* are elevational views of a computer monitor with a video camera according to the invention and the prior art, respectively.

FIG. 10a shows the image of the user in the image plane 21 of the monitor 22. As may be seen, the eyes of the user are peering substantially straight ahead so that it appears the user is looking outward in a direction perpendicular to the image plane.

Figure 10B:
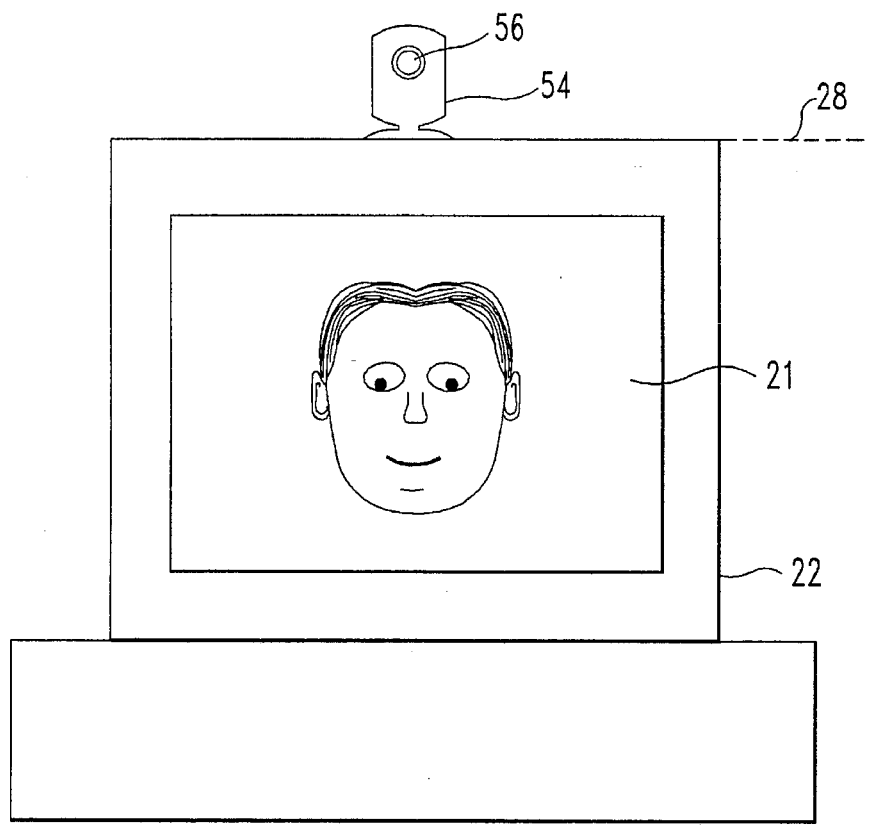

FIG. 10b illustrates (in exaggerated form) the effect of arranging a video camera 54 on top of the monitor 22 in the manner known in the prior art. In this case, the lens 56 is disposed substantially above the level 28 of the top of the monitor. As a result, the eyes of the user appear to be peering downward, rather than directly outward as is shown in FIG. 10a.

Figure 11:
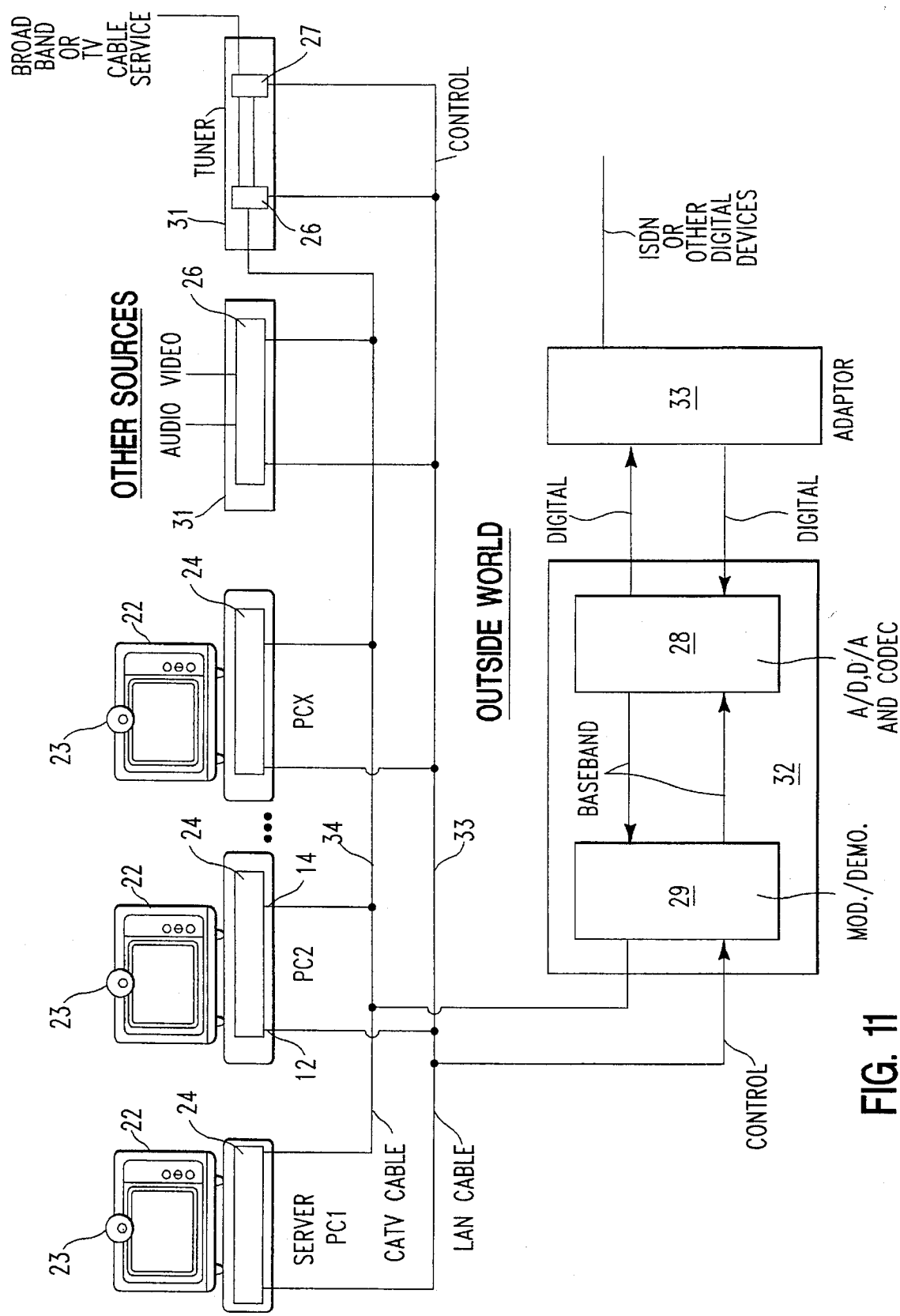
FIG. 11 is a block diagram of a videoconferencing system according to the present invention.

FIG. 11 shows a videoconferencing network according to the present invention. A plurality of terminals PC1, PC2 . . . PCX are provided, each having a monitor 22 and a video camera 23. A control system 24, which includes a computer, video camera controller, audio controller, video display controller, and network interfaces is provided in conjunction with each terminal PC1, PC2 . . . PCX. Each such control system 24 includes an interface to a digital computer local area network 27 and an interface to a frequency modulated video distribution network 26. The video distribution network may therefore be provided through a standard video cable 34, running in parallel to a digital computer local area network 33. Other devices or sources may also interface to the videoconference network system through optional control systems 31. These sources include video tape recorders, broad band or cable service feeds, satellite links, etc. The digital computer local area network communicates control signals through the local area network cable 33 to and between the various terminals PC1, PC2 . . . PCX.

The videoconferencing system may also interface with a digital signal videoconference system for, e.g., wide area teleconferencing, through a digital adapter 32, which includes a modulator/demodulator 29 and an analog digital interface 28, which includes an analog to digital converter, a digital to analog converter as well as a CODEC device, translating between formats, including a compressed digital format suitable for transmission over a public switched telecommunication network (PSTN) or dedicated lines. The analog digital interface 28 is connected to the PSTN through an adapter 30, which may be a DSU/CSU, ISDN or other type of interface.

It should be understood that the preferred embodiments and examples described herein are for illustrative purposes only and are not to be construed as limiting the scope of the present invention, which is properly delineated only in the appended claims.

What is claimed is:

1. In a video camera adapted for use with, and for retrofit mounting on a computer monitor for a personal computer (PC) workstation, said video camera comprising a first housing, an optical window with an optical axis and an optical video sensor arranged to receive an optical image passed through said window, said window and said sensor being mounted in said first housing and arranged to view the face of a computer operator at said PC workstation, said video camera being connectable and operable as a single camera unit in a videoconferencing system for said PC workstation, said monitor comprising a second housing and a display screen mounted in the second housing and arranged to be viewed by the computer operator, said display screen having an image display surface with a central point and a central axis extending outward from said central point perpendicular to said display surface, said second housing including a frame portion disposed adjacent to and surrounding said display surface, said frame portion having a top surface and two lateral side surfaces; the improvement wherein said first housing is so configured, when mounted on said top surface of said second housing with said optical axis parallel to said central axis, as to position said optical window between said frame portion and the computer operator, with its optical axis intersecting said frame portion at a position below said top surface and between said lateral side surfaces of said frame portion; whereby the optical window is arranged at substantially eye level of the computer operator such that eyes of the operator's face in the image formed by the video sensor appear to be looking directly into the optical window when the computer operator is gazing at the display screen.

2. The video camera according to claim 1, wherein said first housing includes means for attachment to said second housing.

3. The video camera according to claim 2, wherein said attachment means includes means for adjusting the orientation of the video camera on said second housing, whereby the optical axis of the optical window may be adjusted with respect to the central axis of the display surface.

4. The video camera according to claim 1, further comprising an audio pickup system arranged in said first housing.

5. The video camera according to claim 1, further comprising an audio speaker arranged in said first housing.

6. The video camera according to claim 5, wherein said audio speaker has an acoustic emission pattern directed toward said display surface, such that sound is reflected off said display surface toward the computer operator.

7. The video camera according to claim 6, wherein said audio speaker is located in said first housing behind said optical window in a portion of said first housing that extends forward of said frame portion of said second housing toward the computer operator.

8. The video camera according to claim 1, further comprising, within said first housing, an audio pickup system, an audio speaker and an audio controller to prevent feedback from said audio speaker to said audio pickup system.

9. The video camera according to claim 8, wherein said controller is a full duplex audio controller.

10. The video camera according to claim 1, wherein said optical window includes a lens.

11. The video camera according to claim 1, further comprising a system for compensating for ambient illumination conditions.

12. The video camera according to claim 1, wherein said videoconferencing system comprises an analog transmission format.

13. The video camera according to claim 12, further comprising an interface for converting an analog format to a digital format for communication with a second videoconferencing system.

14. The video camera according to claim 1, wherein said videoconferencing system comprises an analog format for transmission of image signals and a digital format for transmission of control signals.

15. The video camera according to claim 14, wherein said analog format and said digital format are transmitted on different physical media.

16. The video camera according to claim 1, wherein, when mounted on said second housing, said first housing has a main portion arranged on said top surface of said second housing and a lower dependent portion arranged in front of said frame portion and extending below said top surface.

17. The video camera according to claim 1, further comprising a solid state device disposed on said first housing above said optical window and facing said computer operator.

* * * * *